(12) United States Patent
George et al.

(10) Patent No.: US 9,286,055 B1
(45) Date of Patent: Mar. 15, 2016

(54) SYSTEM, METHOD, AND COMPUTER PROGRAM FOR AGGREGATING FRAGMENTS OF DATA OBJECTS FROM A PLURALITY OF DEVICES

(71) Applicant: Amdocs Software Systems Limited, Dublin (IE)

(72) Inventors: Christopher James George, Priddy (GB); Stephen Palmer, Wiltshire (GB); Ulf Mathias Landby, London (GB)

(73) Assignee: Amdocs Software Systems Limited, Dublin (IE)

( * ) Notice: Subject to any disclaimer, the term of this patent is extended or adjusted under 35 U.S.C. 154(b) by 19 days.

(21) Appl. No.: 14/222,513

(22) Filed: Mar. 21, 2014

Related U.S. Application Data

(60) Provisional application No. 61/807,802, filed on Apr. 3, 2013.

(51) Int. Cl.
*G06F 9/44* (2006.01)
*G06F 9/445* (2006.01)

(52) U.S. Cl.
CPC ........................................ *G06F 8/65* (2013.01)

(58) Field of Classification Search
CPC .............. G06F 8/65; G06F 8/67; H04L 29/06
USPC ......................................................... 717/171
See application file for complete search history.

(56) References Cited

U.S. PATENT DOCUMENTS

| | | | |
|---|---|---|---|
| 8,549,249 B1* | 10/2013 | Metcalf et al. ................. | 711/166 |
| 2011/0179150 A1* | 7/2011 | Ravichandran et al. ...... | 709/221 |
| 2012/0089669 A1* | 4/2012 | Berg et al. ..................... | 709/203 |
| 2013/0124600 A1* | 5/2013 | Jaroker ......................... | 709/202 |
| 2014/0189672 A1* | 7/2014 | Raundahl Gregersen et al. ............................ | 717/168 |

* cited by examiner

*Primary Examiner* — John Chavis
(74) *Attorney, Agent, or Firm* — Zilka-Kotab, PC

(57) ABSTRACT

A system, method, and computer program product are provided for aggregating fragments of data objects from a plurality of devices. In use, a first data fragment associated with a first data object to be migrated from at least one first device associated with a legacy code to a second device associated with a target code is received, the first data fragment including at least a first portion of the first data object. Additionally, it is determined that the first data fragment is one of a plurality of data fragments that comprise the first data object. In response to determining that the first data fragment is one of a plurality of data fragments that comprise the first data object, the first data fragment is stored in a memory. Further, the memory is monitored to determine whether all of the plurality of data fragments that comprise the first data object are present in the memory. In response to determining that all of the plurality of data fragments that comprise the first data object are present in the memory, the first data object is assembled from the plurality of data fragments. Moreover, the first data object is automatically migrated to the second device associated with the target code.

20 Claims, 10 Drawing Sheets

SYSTEM, METHOD, AND COMPUTER PROGRAM FOR AGGREGATING FRAGMENTS OF DATA OBJECTS FROM A PLURALITY OF DEVICES

CLAIM OF PRIORITY

This application claims the benefit of U.S. Provisional Application No. 61/807,802, filed Apr. 3, 2013, the entire contents of which are incorporated herein by reference,

FIELD OF THE INVENTION

The present invention relates to computer infrastructures, and more particularly to updating such computer infrastructures.

BACKGROUND

Many telecommunications providers are investing significant effort to simplify and consolidate their software infrastructure, often replacing multiple legacy applications with a single COTS (Commercial Off-The-Shelf) application. Part of the consolidation process involves migrating data from legacy applications (i.e. source applications) to new target applications, and then capturing subsequent changes to the data in the legacy applications and replicating those changes to the target application in near real-time.

Aggregating fragments of data associated with a data object before the data object can be re-assembled and processed is a challenge encountered during the near real-time replication process. There is thus a need for addressing these and/or other issues associated with the prior art.

SUMMARY

A system, method, and computer program product are provided for aggregating fragments of data objects from a plurality of devices. In use, a first data fragment associated with a first data object to be migrated from at least one first device associated with a legacy code to a second device associated with a target code is received, the first data fragment including at least a first portion of the first data object. Additionally, it is determined that the first data fragment is one of a plurality of data fragments that comprise the first data object. In response to determining that the first data fragment is one of a plurality of data fragments that comprise the first data object, the first data fragment is stored in a memory. Further, the memory is monitored to determine whether all of the plurality of data fragments that comprise the first data object are present in the memory. In response to determining that all of the plurality of data fragments that comprise the first data object are present in the memory, the first data object is assembled from the plurality of data fragments. Moreover, the first data object is automatically migrated to the second device associated with the target code.

DETAILED DESCRIPTION

Figure 1:
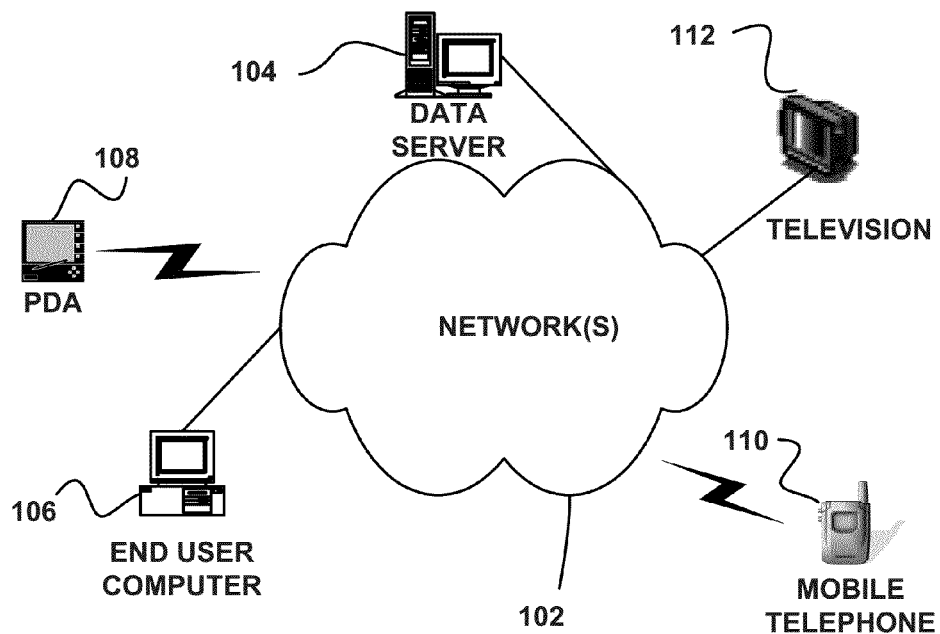
FIG. 1 illustrates a network architecture, in accordance with one possible embodiment.

FIG. 1 illustrates a network architecture 100, in accordance with one possible embodiment. As shown, at least one network. 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
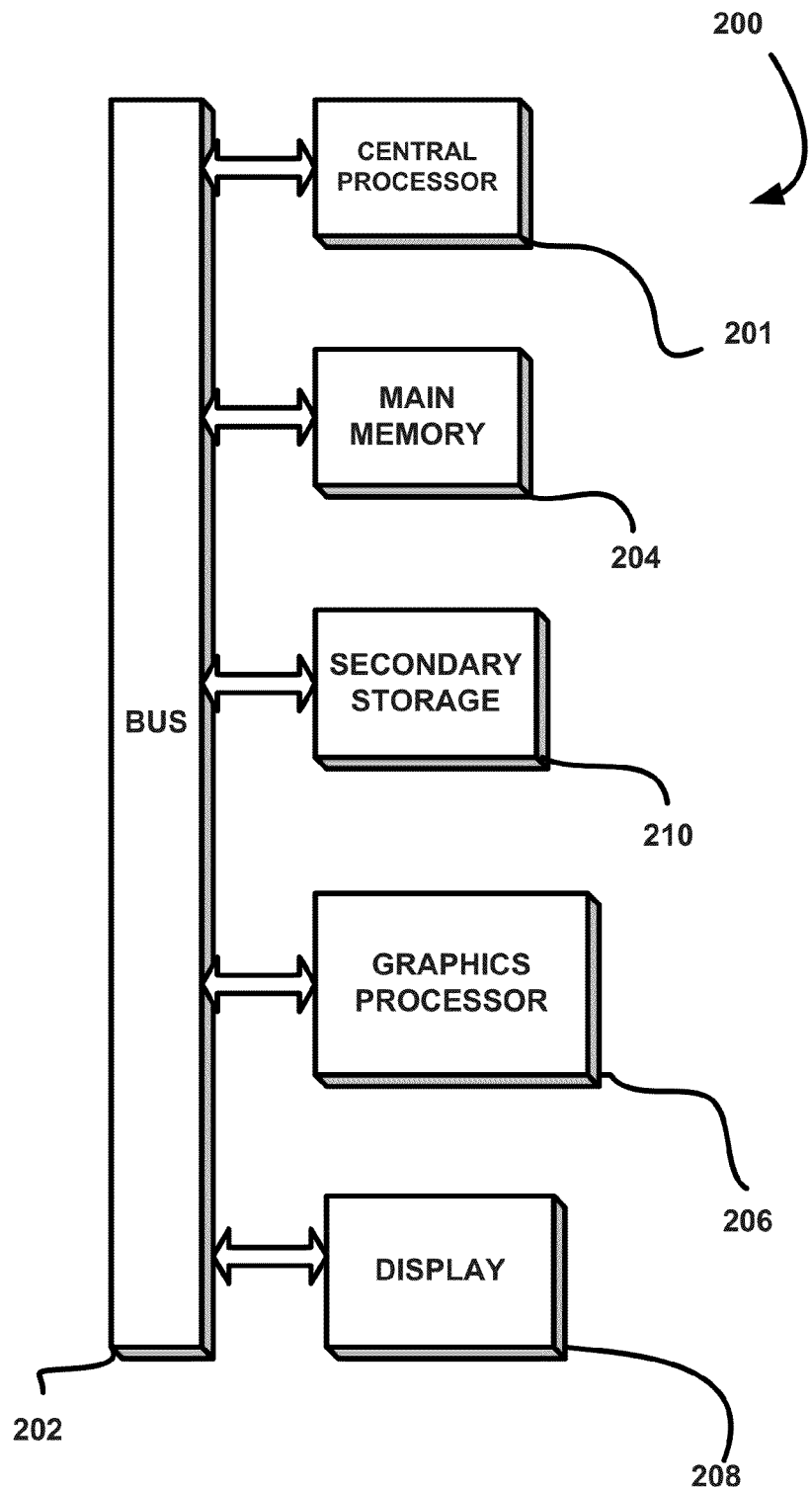
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example).

Memory 204, storage 210 and/or any other storage are possible examples of tangible computer-readable media.

Figure 3:
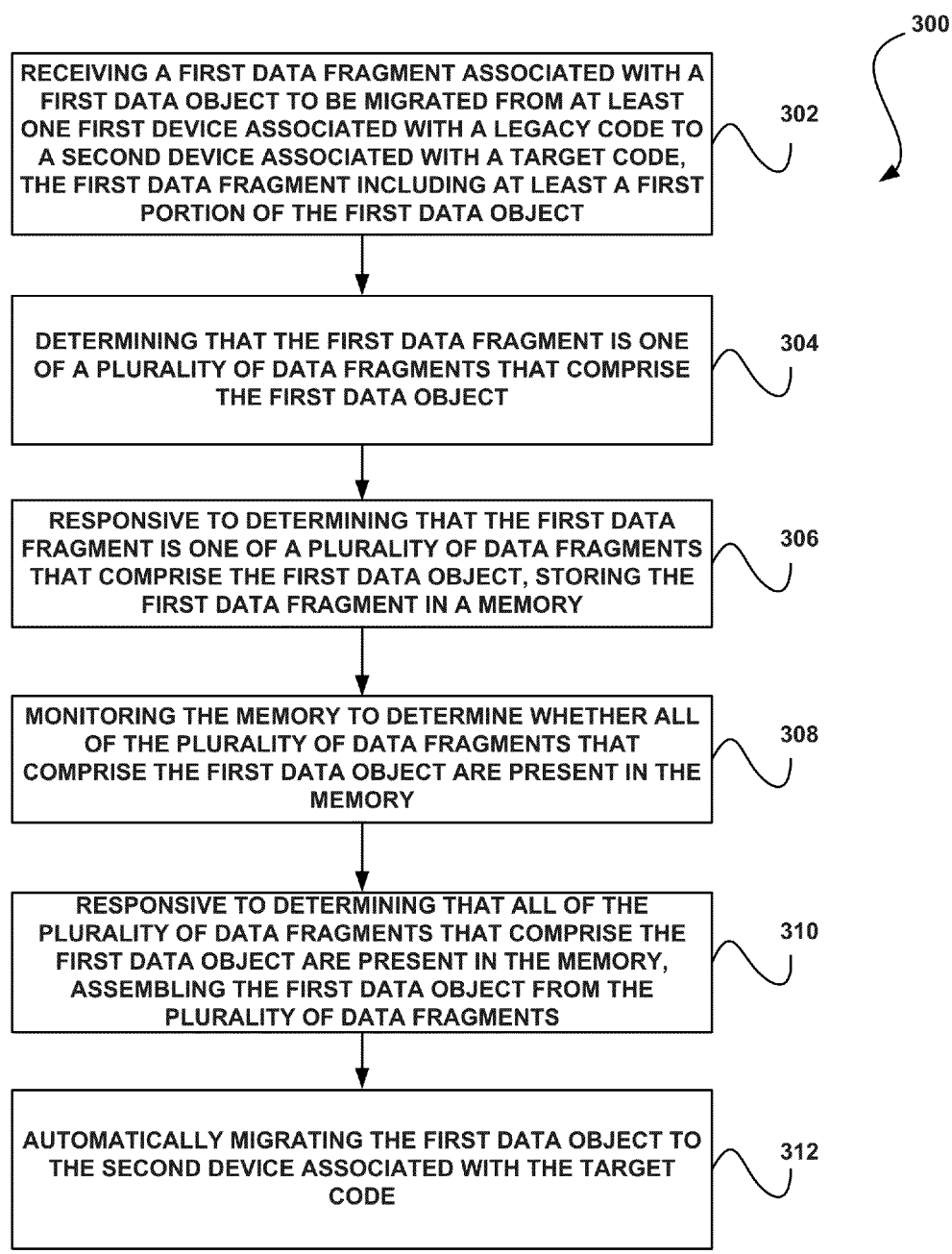
FIG. 3 illustrates a method for aggregating fragments of data objects from a plurality of devices, in accordance with one embodiment.

FIG. 3 illustrates a method 300 for aggregating fragments of data objects from a plurality of devices, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown, a first data fragment associated with a first data object to be migrated from at least one first device associated with a legacy code to a second device associated with a target code is received, the first data fragment including at least a first portion of the first data object. See operation 302.

In the context of the present description, legacy code refers to any computer code, computer program, software application, and/or combination thereof, that is associated with a software infrastructure. In one embodiment, the legacy code may represent applications or code associated with a current or past software infrastructure, which is to be updated to a new software infrastructure.

Similarly, target code may refer to any computer code, computer program, software application, and/or combination thereof, that is associated with a software infrastructure. In one embodiment, the target code may represent applications or code associated with a new software infrastructure that is to be updated from a current or past software infrastructure. For example, in one embodiment, the legacy code may represent multiple legacy applications and the target code may represent a single COTS (Commercial Off-The-Shelf) application.

The first device and the second device may include a variety of devices. For example, in various embodiments, the first device and/or the second device may include server devices, client devices, databases, cache memory, and/or various other types of devices.

Furthermore, the data objects may include any data object associated with the legacy code and/or the target code. For example, in one embodiment, the data objects may include data objects generated by the legacy code.

As shown further in FIG. 3, it is determined that the first data fragment is one of a plurality of data fragments that comprise the first data object. See operation 304. The first data fragment may include any portion of the data object. In one embodiment, the plurality of data fragments comprising the first data object may be stored across a plurality of devices associated with the legacy code. For example, the first data fragment may be stored in the first device and a second data fragment may be stored in another device associated with the legacy code.

Furthermore, in one embodiment, the first data fragment associated with the first data may be received at an aggregation component capable of combining the aggregate fragments to reform the first object. In this case, the aggregate component may include any hardware, software, and/or device.

It may be determined that the first data fragment is one of a plurality of data fragments that comprise the first data object utilizing a variety of techniques. In one embodiment, the first data fragment may be marked or associated with a number that identifies the first data fragment as a portion of the first data object (e.g. 1 of 4, etc.).

For example, each of plurality of data fragments that comprise the first data object may be assigned a unique part number, where the part number corresponds to a unique number out of a total number of the plurality of data fragments that comprise the first data object. In this case, determining that the first data fragment is one of the plurality of data fragments that comprise the first data object may include identifying a first unique part number associated with the first data fragment.

In another embodiment, each of plurality of data fragments that comprise the first data object may be assigned a unique key. In this case, determining that the first data fragment is one of the plurality of data fragments that comprise the first data object may include identifying the first data object is associated with more than one unique key.

In response to determining that the first data fragment is one of a plurality of data fragments that comprise the first data object, the first data fragment is stored in a memory. See operation 306. For example, in one embodiment, the first data fragment may be stored in a cache associated with the aggregation component.

Further, the memory is monitored to determine whether all of the plurality of data fragments that comprise the first data object are present in the memory. See operation 308. For example, the memory may be monitored for data fragment arrival. Upon arrival of a data fragment, it may be determined whether the plurality of data fragments that comprise the first data object are present in the memory. In another embodiment, the memory may be monitored on a periodic basis to be determine whether the plurality of data fragments that comprise the first data object are present in the memory.

In response to determining that all of the plurality of data fragments that comprise the first data object are present in the memory, the first data object is assembled from the plurality of data fragments. See operation 310. Moreover, the first data object is automatically migrated to the second device associated with the target code. See operation 312.

In one embodiment, at least one of the plurality of data fragments may be converted to a common internal format before assembling the first data object from the plurality of data fragments. Additionally, in one embodiment, the first data object may be migrated to the second device associated with the target code in the common internal format.

Additionally, in one embodiment, the method 300 may include determining a type of operation associated with the first data object, in response to receiving the first data fragment associated with the first data object. For example, the type of operation associated with the first data object may include an insert operation, an update operation, or a delete operation.

As an example, it may be determined that the type of operation associated with the first data object includes an insert operation. In this case, responsive to determining that the first data fragment is one of the plurality of data fragments that comprise the first data object, a number of the plurality of data fragments that comprise the first data object may be determined. Further, the number may be stored as a value with the first data fragment in the memory. In this way, the number of fragments needed to assemble the data object may be determined.

As another example, the type of operation associated with the first data object may be determined to include a delete operation. In this case, existing keys associated with the first data object may be identified in an ID cache. If more than one existing key associated with the first data object is identified, it may be determined that the first data fragment is one of the plurality of data fragments that comprise the first data object.

In various embodiments, in response to identifying more than one existing key associated with the first data object, the delete operation may be performed on the first data fragment, the delete operation may be performed on the first data fragment if the first data fragment is marked with particular information (e.g. indicating the data fragment is a primary source of the first data object, etc.), or the delete operation may be performed on the first data fragment after determining that all of the plurality of data fragments are present in the memory. In this case, delete operation execution may be defined by a system operator, etc.

In certain circumstances, object instances may exist in fragments across some, or all, source applications. If a change to a unique object instance is detected in one or more source applications, all fragments of the object instance must he aggregated before the object instance can be re-assembled and replicated to a target application. Aggregation refers to the process of gathering fragments of data that relate to a particular object instance, assembling these fragments into a single representation of that object, before writing it into the target application.

Elapsed time is another reason for the need to aggregate fragments. Objects may not have been created or updated on all source applications at the same point in time, thereby introducing cross-system delays before the object can be assembled and replicated to a target application. In one embodiment, the aggregation technique/component described in the context of FIG. 3 may function to resolve such issues of elapsed time by caching related fragments until the complete object can he assembled.

More illustrative information will now be set forth regarding various optional architectures and uses in which the foregoing method may or may not be implemented, per the desires of the user. It should be strongly noted that the following information is set forth for illustrative purposes and should not he construed as limiting in any manner. Any of the following features may be optionally incorporated with or without the exclusion of other features described.

Figure 4:
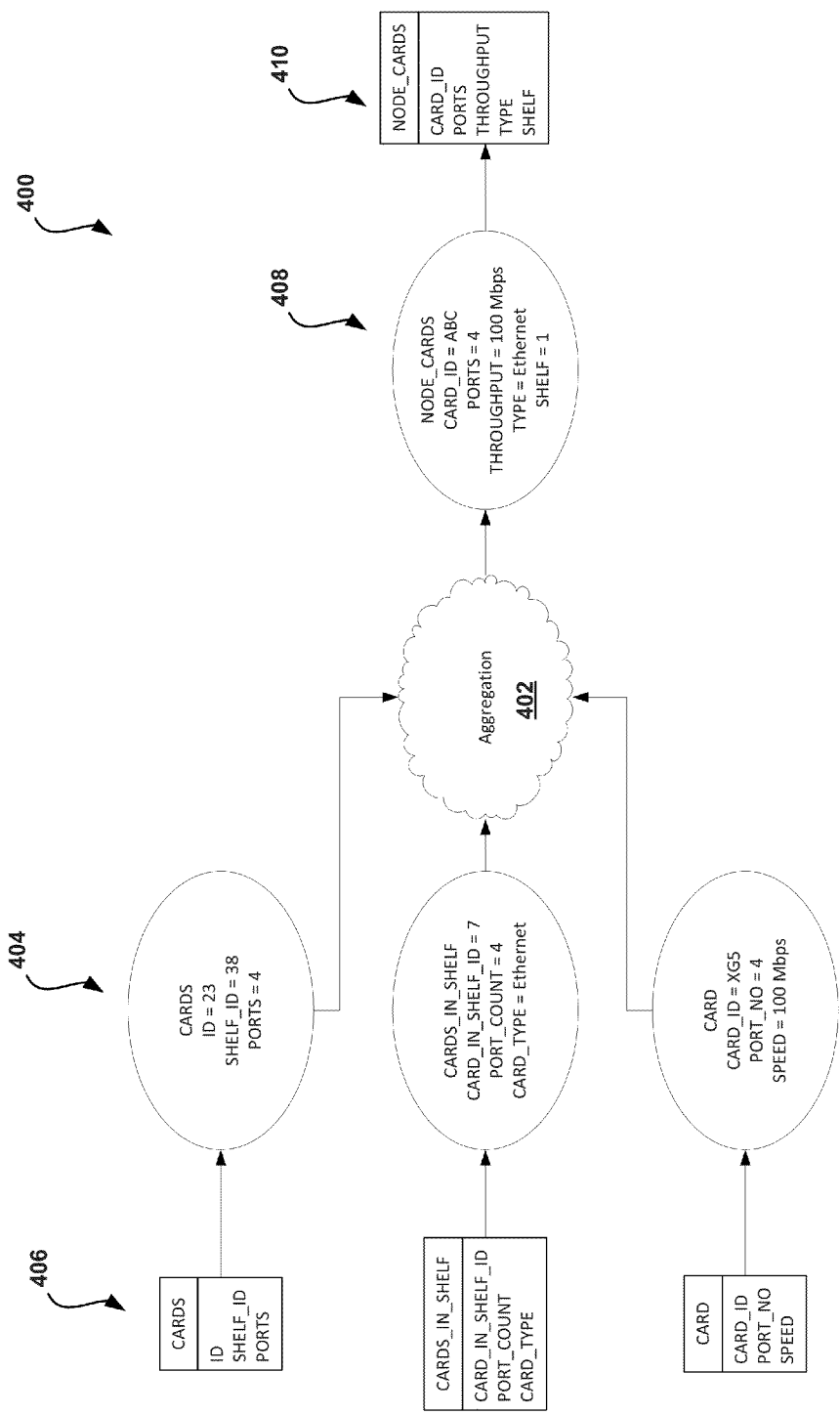
FIG. 4 illustrates a flow diagram showing an example of multiple source devices storing slightly different information about a data object to be migrated to a target device in accordance with one embodiment.

FIG. 4 illustrates a flow diagram 400 showing an example of multiple source devices storing slightly different information about a data object to he migrated to a target device, in accordance with one embodiment. As an option, the flow diagram 400 may be implemented in the context of the details of FIGS. 1-3. Of course, however, the flow diagram 400 may be implemented in the context of any desired environment. Further, the aforementioned definitions may equally apply to the description below.

FIG. 4 provides one example of the different table structures 406 and 410 in a source and a target application and the entity instances holding the data. An aggregation component 402 is responsible for ultimately bridging the gap between source and target applications. In operation, the aggregation component 402 may assemble data fragments from multiple sources 404, where the sources 404 are storing slightly different information about a data object "cards". All of the information maintained in the three sources 404 must be replicated into a target system 408, the replicated data being represented by a single table 410 in this example.

Figure 5:
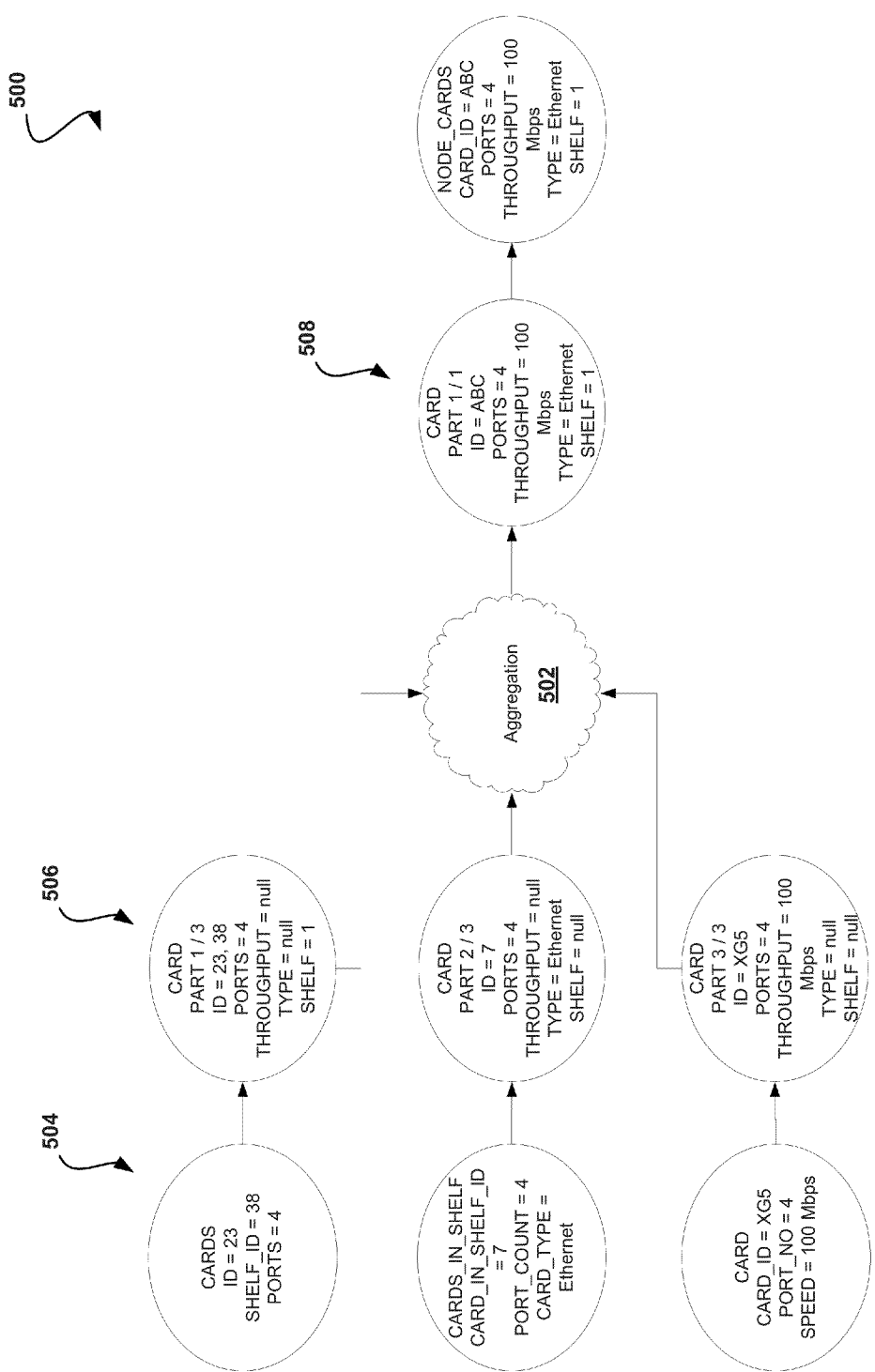
FIG. 5 illustrates a flow diagram showing how entity instances from a source application are transformed in to a common internal format before being processed, in accordance with one embodiment.

FIG. 5 illustrates a flow diagram 500 showing how entity instances from a source application are transformed in to a common internal format before being processed, in accordance with one embodiment. As an option, the flow diagram 500 may be implemented in the context of the details of FIGS. 1-4. Of course, however, the flow diagram 500 may be implemented in the context of any desired environment. Further, the aforementioned definitions may equally apply to the description below.

FIG. 5 shows one example of how a plurality of entity instances 504 from at least one source application are transformed in to a common internal format before being processed by an aggregation component 502. The same common internal format may also be used to represent a combined set of data that is written to a target system 508. In one embodiment, each object from a source application may be assigned a part number out of the total number of parts needed to assemble the output object (e.g. see fragments 506). The part number and total number of parts may be used together to determine whether the object is a fragment of a larger object.

Figure 6:
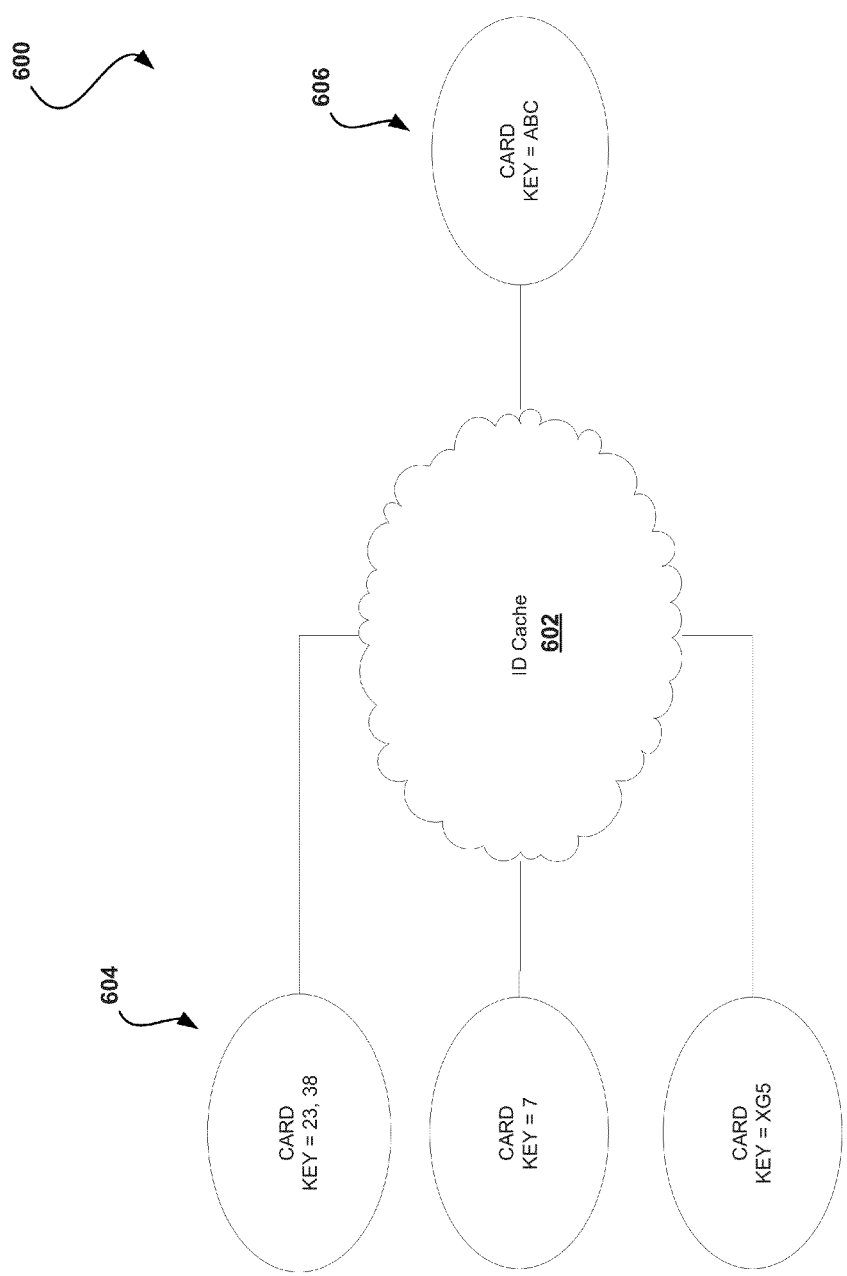
FIG. 6 illustrates a flow diagram showing how primary keys of objects in source and target applications are linked by an ID cache, in accordance with one embodiment.

FIG. 6 illustrates a flow diagram 600 showing how primary keys of objects in source and target applications are linked by an ID cache, in accordance with one embodiment, As an option, the flow diagram 600 may be implemented in the context of the details of FIGS. 1-5. Of course, however, the flow diagram 600 may be implemented in the context of any desired environment. Further, the aforementioned definitions may equally apply to the description below.

FIG. 6 details how primary keys of objects in source and target applications are linked by an ID cache 602. In one embodiment, the purpose of the ID (identity, or primary key) cache may be to maintain relationships between source keys associated with data object fragments 604 and target keys associated with data objects 606. An object that has two or more source keys may be processed by the aggregation component 602.

Aggregation may be implemented when the same object exists in two or more source applications and the object is to be replicated to a target as one combined unit. Accordingly, in one embodiment, an ID cache component may be utilized to manage relationships between keys of associated objects across system boundaries.

Figure 7:
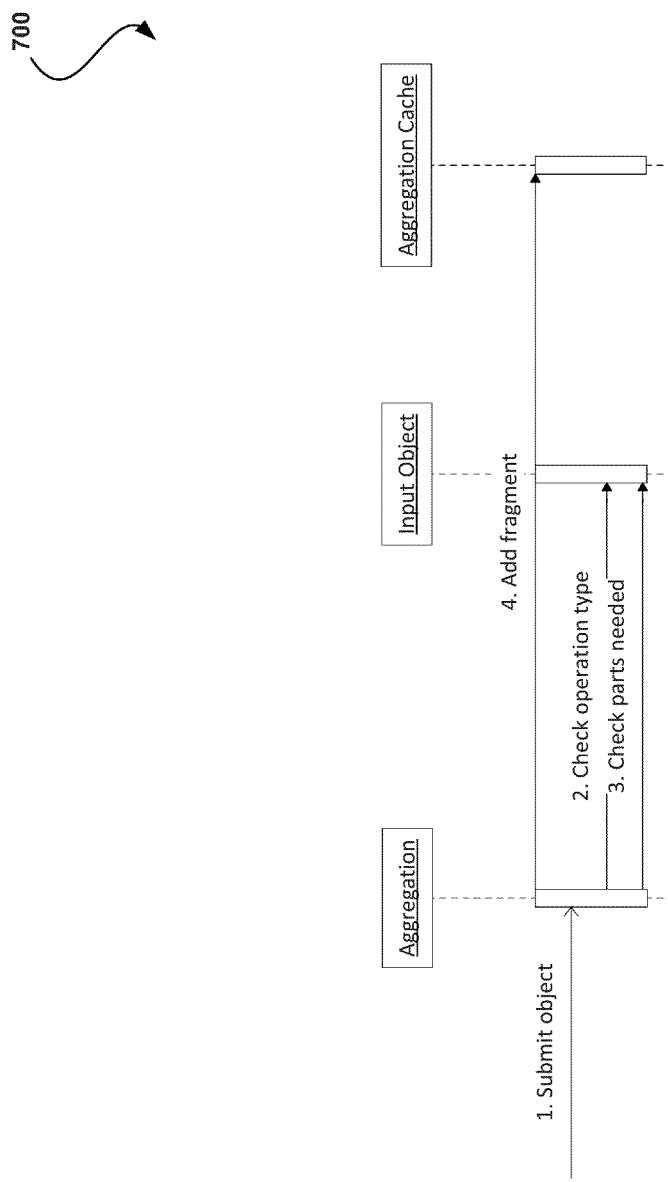
FIG. 7 illustrates a flow diagram showing the processing of an insert operation associated with a data object, in accordance with one embodiment.

FIG. 7 illustrates a flow diagram 700 showing the processing of an insert operation associated with a data object, in accordance with one embodiment. As an option, the flow diagram 700 may be implemented in the context of the details of FIGS. 1-6. Of course, however, the flow diagram 700 may be implemented in the context of any desired environment. Further, the aforementioned definitions may equally apply to the description below, As shown, when new data in source applications is detected, input objects containing the captured changed data are passed to an aggregation component. In operation, an input object is submitted to the aggregation component, See step 1.

Further, the type of operation (e.g. insert, update, or delete, etc.) is verified. See step 2. An insert operation is assumed for the context of FIG. 7.

If more than one part is required to create the output object, the input object is ascertained to be a fragment of a larger object. See step 3. The number of parts needed to create the output object is stored as a value in the input object, and is set prior to the fragment being passed to the aggregation component.

The fragment \input object is then passed to the aggregation caching component. See step 4. The input object is added to cache, awaiting arrival of the remaining parts needed to create the output object.

Figure 8:
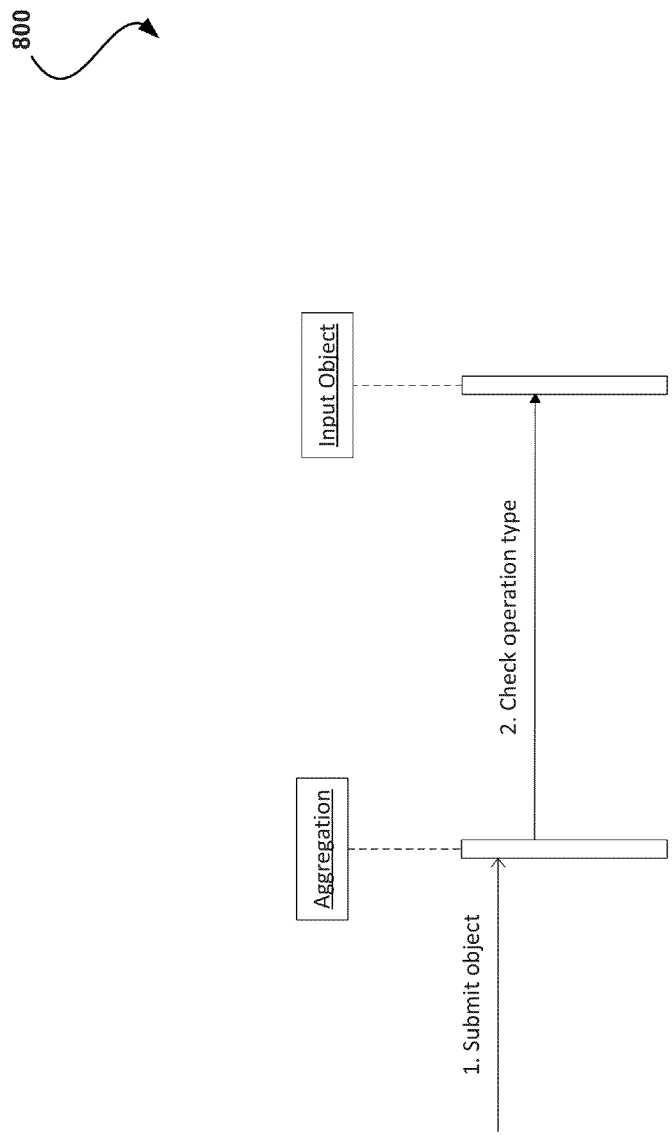
FIG. 8 illustrates a flow diagram showing the processing of an update operation associated with a data object, in accordance with one embodiment.

FIG. 8 illustrates a flow diagram 800 showing the processing of an update operation associated with a data object, in accordance with one embodiment. As an option, the flow diagram 800 may be implemented in the context of the details of FIGS. 1-7. Of course, however, the flow diagram 800 may be implemented in the context of any desired environment. Further, the aforementioned definitions may equally apply to the description below.

As shown, an input object including the updated data is submitted to the aggregation component. See step 1. The type of operation (e.g. insert, update, or delete) is verified. See step 2, If the operation is an update operation, no further processing is needed by the aggregation component, since updates rely on the create operation, which has previously assembled and processed the combined object.

Figure 9:
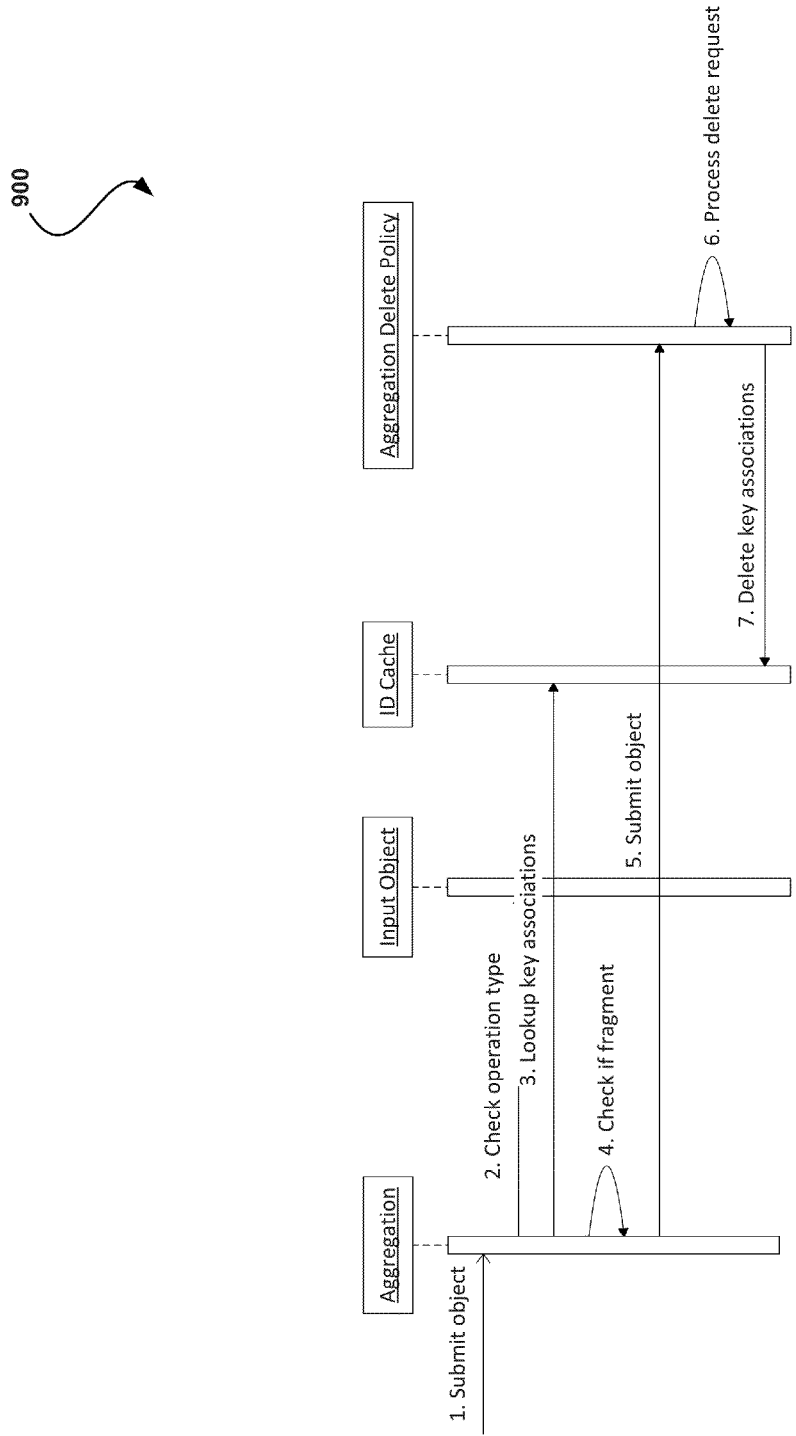
FIG. 9 illustrates a flow diagram showing the processing of a delete operation associated with a data object, in accordance with one embodiment.

FIG. 9 illustrates a flow diagram 900 showing the processing of a delete operation associated with a data object, in accordance with one embodiment. As an option, the flow diagram 900 may be implemented in the context of the details of FIGS. 1-8. Of course, however, the flow diagram 900 may be implemented in the context of any desired environment. Further, the aforementioned definitions may equally apply to the description below.

As shown, an input object including the object to be deleted is submitted to the aggregation component, See step 1. The type of operation (e.g. insert, update, or delete) is verified. See step 2. A delete operation is assumed for the context of FIG. 9.

The existing key associations for the input object are looked up in the ID cache component using the input object primary key. See step 3. If there are two or more source keys available in the key associations, the object being processed is a fragment See step 4. If there is only a single source key in the key associations, this is not a fragment and no further processing by the aggregation component is necessary.

The input object is passed to an Aggregation Delete Policy component. See step 5. This component may be configured with various algorithms for deciding how to process the delete request of a fragment. There are several options for algorithms to decide how to process delete requests.

For example, the delete request may be processed on the target object, irrespective of the number of existing source applications also referencing the target object. As another example, the delete request may be processed only if the input object is marked with particular information, such as being the "primary source" of the target object. As another example, the delete request may be processed only after a defined number of fragments arrive, all of which fragments requesting the target object are to be deleted. This implies the individual delete requests will need to be cached while waiting for further delete requests to arrive. If, or when, the delete request is executed, the source and target key associations are deleted from the ID cache. See step 6.

The aggregation cache deduces if there are target objects for which all fragments have been received, in which case the fragments are combined and passed to the target for processing.

Figure 10:
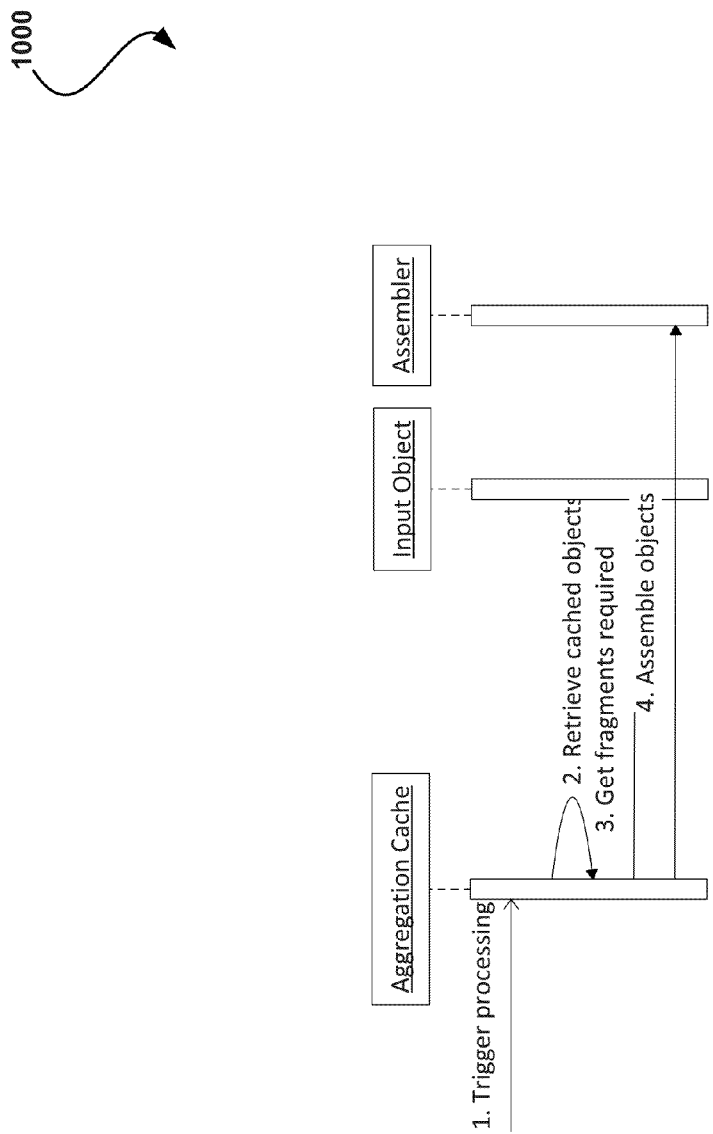
FIG. 10 illustrates a flow diagram for determining if there are target objects in an aggregation cache for which all fragments have been received, in accordance with one embodiment

FIG. 10 illustrates a flow diagram 1000 for determining if there are target objects in an aggregation cache for which all fragments have been received, in accordance with one embodiment. As an option, the flow diagram 1000 may be implemented in the context of the details of FIGS. 1-9. Of course, however, the flow diagram 1000 may be implemented in the context of any desired environment. Further, the aforementioned definitions may equally apply to the description below.

As shown, processing by the aggregation cache is triggered, either by the arrival of a new fragment, or by a timer. See step 1. All fragments associated with the same target object are retrieved from the cache. See step 2.

Further, it is determined how many fragments are available, and how many fragments constitute the target object by inspecting the total number of parts needed in one of the fragments. See step 3. If the number of fragments needed is equal to the number of fragments available, the operation can be processed.

The fragments are passed to an assembler component that takes responsibility for merging the content of the fragments into a single target object. See step 4. The fragments are then removed from the aggregation cache. The process moves on to the next target object and its available fragments until all target objects have been traversed.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising computer code for:

receiving a first data fragment associated with a first data object to be migrated from at least one first device having a legacy, application to a second device having a target application where the legacy application generated the first data object;

determining that the first data fragment is one of a plurality of data fragments that comprise the first data object;

responsive to determining that the first data fragment is one of a plurality of data fragments that comprise the first data object, storing the first data fragment in a cache memory;

receiving additional data fragments of the plurality of data fragments that comprise the first data object, and storing the additional data fragments in the cache memory;

monitoring the cache memory to determine whether all of the plurality of data fragments that comprise the first data object are present in the cache memory;

responsive to determining that all of the plurality of data fragments that comprise the first data object are present in the cache memory, assembling the first data object from the plurality of data fragments; and automatically migrating the first data object to the second device associated with the target application.

2. The computer program product of claim 1, wherein the computer program product is operable such that the plurality of data fragments comprising the first data object are stored across a plurality of devices associated with the legacy code.

3. The computer program product of claim 1, further comprising computer code for converting at least one of the plurality of data fragments to a common internal format before assembling the first data object from the plurality of data fragments.

4. The computer program product of claim 3, wherein the computer program product is operable such that the first data object is migrated to the second device associated with the target code in the common internal format.

5. The computer program product of claim 1, wherein the computer program product is operable such that each of plurality of data fragments that comprise the first data object are assigned a unique part number, the part number corresponding to a unique number out of a total number of the plurality of data fragments that comprise the first data object.

6. The computer program product of claim 5, wherein the computer program product is operable such that determining that the first data fragment is one of the plurality of data fragments that comprise the first data object includes identifying a first unique part number associated with the first data fragment.

7. The computer program product of claim 1, wherein the computer program product is operable such that each of plurality of data fragments that comprise the first data object are assigned a unique key.

8. The computer program product of claim 7, wherein the computer program product is operable such that determining that the first data fragment is one of the plurality of data fragments that comprise the first data object includes identifying the first data object s associated with more than one unique key.

9. The computer program product of claim 1, wherein the computer program product is operable such that the first data fragment associated with the first data is received at an aggregation component.

10. The computer program product of claim 1, further comprising computer code for determining a type of operation associated with the first data object, in response to receiving the first data fragment associated with the first data object.

11. The computer program product of claim 10, wherein the computer program product is operable such that the type of operation associated with the first data object includes one of an insert operation, an update operation, or a delete operation.

12. The computer program product of claim 11, further comprising computer code for determining the type of operation associated with the first data object includes the insert operation.

13. The computer program product of claim 12, further comprising computer code for, responsive to determining that the first data fragment is one of the plurality of data fragments that comprise the first data object, determining a number of the plurality of data fragments that comprise the first data object.

14. The computer program product of claim 13, further comprising computer code for storing the number as a value with the first data fragment in the memory.

15. The computer program product of claim 11, further comprising computer code for determining the type of operation associated with the first data object includes the delete operation.

16. The computer program product of claim 15, further comprising computer code for identifying existing keys associated with the first data object in an ID cache.

17. The computer program product of claim 16, wherein the computer program product is operable such that if more than one existing key associated with the first data object is identified, determining that the first data fragment is one of the plurality of data fragments that comprise the first data object.

18. The computer program product of claim 17, further comprising computer code for, in response to identifying more than one existing key associated with the first data object, performing one of:
  processing the delete operation associated with the first data fragment;
  processing the delete operation associated with the first data fragment, only if the first data fragment is marked with particular information; or
  processing the delete operation associated with the first data fragment after determining that all of the plurality of data fragments are present in the memory.

19. A method, comprising:
receiving a first data fragment associated with a first data object to be migrated from at least one first device having a legacy application to a second device having a target application, where the legacy application generated the first data object;
determining that the first data fragment is one of a plurality of data fragments that comprise the first data object;
responsive to determining that the first data fragment is one of a plurality of data fragments that comprise the first data object, storing the first data fragment in a cache memory;
receiving additional data fragments of the plurality of data fragments that comprise the first data object, and storing the additional data fragments in the cache memory;
monitoring the cache memory to determine whether all of the plurality of data fragments that comprise the first data object are present in the cache memory;
responsive to determining that all of the plurality of data fragments that comprise the first data object are present in the cache memory, assembling the first data object from the plurality of data fragments; and
automatically migrating the first data object to the second device associated with the target application.

20. A system comprising:
a memory system; and
one or more processing cores coupled to the memory system and that are each configured for:
receiving a first data fragment associated with a first data object to be migrated from at least one first device having a legacy application to a second device having a target application, where the legacy application generated the first data object;
determining that the first data fragment is one of a plurality of data fragments that comprise the first data object;
responsive to determining that the first data fragment is one of a plurality of data fragments that comprise the first data object, storing the first data fragment in a cache memory;
receiving additional data fragments of the plurality of data fragments that comprise the first data object, and storing the additional data fragments in the cache memory;
monitoring the cache memory to determine whether all of the plurality of data fragments that comprise the first data object are present in the cache memory;
responsive to determining that all of the plurality of data fragments that comprise the first data object are present in the cache memory, assembling the first data object from the plurality of data fragments; and
automatically migrating the first data Object to the second device associated with the target application.

* * * * *